United States Patent
Palit et al.

(10) Patent No.: US 10,337,889 B2
(45) Date of Patent: Jul. 2, 2019

(54) INDUCTIVE POSITION DETERMINATION

(71) Applicant: ZF Friedrichshafen AG, Friedrichshafen (DE)

(72) Inventors: Ajoy Palit, Bremen (DE); Joachim Degen, Schermbeck (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 32 days.

(21) Appl. No.: 15/538,164

(22) PCT Filed: Dec. 15, 2015

(86) PCT No.: PCT/EP2015/079699
§ 371 (c)(1),
(2) Date: Jun. 20, 2017

(87) PCT Pub. No.: WO2016/113057
PCT Pub. Date: Jul. 21, 2016

(65) Prior Publication Data
US 2017/0350729 A1 Dec. 7, 2017

(30) Foreign Application Priority Data
Jan. 16, 2015 (DE) .......................... 10 2015 200 620

(51) Int. Cl.
*G01D 5/20* (2006.01)
*G01B 7/00* (2006.01)
*G01D 5/22* (2006.01)

(52) U.S. Cl.
CPC .......... *G01D 5/2013* (2013.01); *G01B 7/003* (2013.01); *G01D 5/2006* (2013.01); *G01D 5/202* (2013.01); *G01D 5/2216* (2013.01)

(58) Field of Classification Search
None
See application file for complete search history.

(56) References Cited

U.S. PATENT DOCUMENTS 7,161,348 B2 * 1/2007 Luber .................... G01D 5/202
324/207.15
2001/0052771 A1 * 12/2001 Jagiella ............... F15B 15/2846
324/207.16
(Continued)

FOREIGN PATENT DOCUMENTS

| DE | 42 13 866 A1 | 10/1992 |
| DE | 44 27 990 A1 | 2/1995 |
| DE | 201 05 164 U1 | 6/2001 |

(Continued)

OTHER PUBLICATIONS

Office Action from corresponding German application No. DE102015200620.4, 8pp., dated Oct. 27, 2015.
(Continued)

*Primary Examiner* — Douglas X Rodriguez
(74) *Attorney, Agent, or Firm* — Brinks Gilson & Lione (57) ABSTRACT

A device for inductive position determination comprises a coil, a positional element, a scanning device for determining an inductance of the coil and an evaluation device for determining a position of the positional element in relation to the coil, based on the inductance determined. In certain embodiments, the positional element comprises a ferromagnetic and electrically insulated material.

10 Claims, 6 Drawing Sheets

(56) References Cited

U.S. PATENT DOCUMENTS

2002/0089326 A1    7/2002   Morrison et al.
2005/0253576 A1    11/2005   Nyce

FOREIGN PATENT DOCUMENTS

| DE | 100 25 661 A1 | 12/2001 |
| DE | 20 2004 019 489 U1 | 5/2005 |
| EP | 1 251 228 A2 | 8/2006 |
| EP | 1 884 749 A1 | 2/2008 |
| EP | 1688709 A2 | 8/2008 |

OTHER PUBLICATIONS

International Search Report and Written Opinion from corresponding International Application No. PCT/EP2015/079699, 9pp., dated Jul. 21, 2016.

\* cited by examiner

INDUCTIVE POSITION DETERMINATION

RELATED APPLICATIONS

This application is a filing under 35 U.S.C. § 371 of International Patent Application PCT/EP2015/079699, filed Dec. 15, 2015, and claims the priority of DE 10 2015 200 620.4, filed Jan. 16, 2015, both of which are incorporated by reference herein in their entirety.

BACKGROUND OF THE INVENTION

1. Field of the Invention

The invention relates to an inductive position determination. In particular, the invention relates to a determination of a relative position of a device on board a motor vehicle.

2. Background Information

A selector lever is provided on a motor vehicle for influencing a gear stage engaged in a transmission. The selector lever can be brought into different positions by the driver, whereby the selector lever can be guided in a link. The position of the selector lever is scanned and processed electrically or electronically. A control device can then control the transmission on the basis of the driver's wish expressed by the position of the selector lever.

The position of the selector lever can be scanned by mounting a series of coils on a console and an electrically conductive damping element on the selector lever, which can be moved in relation to the console. The closer the damping element is to one of the coils, the more the inductance of the coil is reduced by the damping element. The damping element generally consists of a highly conductive material, such as copper, aluminum or brass.

DE 20 2004 019 489 U1 shows an inductive sensor unit, which operates according to this principle. However, relatively large inductances must usually be used for this measuring method. If the coil is to be designed as a printed circuit, it is often necessary to use a plurality of layers, the production of which is complex. In addition, the coils must be manufactured with high accuracy and then tested, which can result in additional costs in production. Furthermore, this type of position measurements may require a multi-stage electronic amplification and possibly a reversing stage.

SUMMARY

The invention has the objective to provide an improved device for inductive position determination. This objective is achieved by means of a device which has the features of the independent claim. Sub-claims represent preferred embodiments.

A device for inductive position determination comprises a coil, a positional element, a scanning device for determining an inductance of the coil and an evaluation device for determining a position of the positional element with respect to the coil, based on the specific inductance. At the same time, the positional element comprises a ferromagnetic and electrically insulated material.

In contrast to a conventional arrangement, in which the positional element comprises an electrically conductive metal and which reduces through the formation of eddy current the inductance of the coil, the ferromagnetic and electrically insulated material can increase the inductance of the coil. As a result, it is possible to magnify a useful signal and a signal-to-noise-ratio (SNR). A multi-stage amplification of the useful signal may not be required. By magnifying the inductance, the basic inductance of the coil can be relatively low, without influencing the positional element. In this way, the measurements of the coil can be reduced. Usually, the inductance of the coil is determined by exciting the coil by means of an electrical frequency. Said frequency can be considerably lower than in well-known arrangements having a metallic positional element. For example, the frequency can amount to app. 12 MHz and thus have a considerably lower magnitude than well-known arrangements. Because of the reduced frequency, a circuit for providing said frequency and the evaluation device can be implemented easier or with more cost-effective components. Switching components for connecting the coil with the frequency can also be more cost-effective. In addition, it is possible to improve the electromagnetic compatibility of the device.

The inductance increase achieved by the positional element can be more concise than the attenuation achieved by a metallic positional element, so that it is possible to select higher tolerances of the elements of the device for inductive position determination. As a result, it is possible to use more cost-effective components and eliminate the process of measuring or synchronizing the device during production.

Preferably, the positional element comprises a relative permeability of more than 150. If the relative permeability of a matter exceeds the number 1, it is called a ferromagnetic matter. Relative permeabilities of ferromagnetic matter usually range between 4 and 15000. A permeability number of more than 150 can ensure that the amplification of the inductance of the coil is sufficiently magnified to generate a reliable measuring signal when approximating the positional element.

Furthermore, it is preferred that the positional element comprises an electrical conductivity of less than $10^{-6}$ S/m. This limit value is generally considered to be a non-conductor, which has no or practically negligible electrical conductance. Alternatively, it is also possible to use different definitions.

Preferably, the coil is designed in the form of a single-layer flat coil. In particular, the coil can be designed in the form of a circuit printed on a board or any other carrier material. The single-layer design makes it possible to eliminate cost and effort involved in measuring and testing, for example, when performing an impedance measurement of multi-layer flat coils. In a different embodiment, the coil can be designed also in the form of a multi-layer flat coil, in particular in the form of a two-layer flat coil on different outer layers of a circuit board or any other comparable carrier material. In the multi-layer flat coil, the number of coils can be reduced or a rougher structure can be used. This can reduce the production costs of the coil.

In an especially preferred embodiment, at least two coils are provided, wherein the positional element can be moved in relation to the coils on a predetermined trajectory, and the evaluation device is configured to determine the position of the positional element on the trajectory, based on inductances of multiple coils. For example, the coils can be mounted directly next to each other on a surface, wherein the trajectory is moved as close as possible along the central points of the coils. As a result, the positional element can closely pass the coils, one by one. Using multiple coils makes it possible to determine the inductances of adjacent coils, in order to determine the position of the positional element with a resolution that is smaller than the distance of the coil center of adjacent coils. In other words, the position of the positional element can be determined more precisely when it assumes a position, in which the inductance of more than one coil is influenced. In particular, the position of the positional element can be determined more precisely between two points, on which the positional element maximally approximates adjacent coils.

The positional element can become smaller at least on one end in the direction of the trajectory. If one length of the positional element in the direction of the trajectory is determined, the positional element can become smaller, in particular tapered, on one end. The base of the positional element that is not tapering can correspond to the base of the coil. At the same time, the coil can have a rectangular or square surface, which is facing the positional element. When the positional element is located directly above a coil, the tapered extension of the positional element can result in the fact that an adjacent coil is influenced precisely to the extent that its measuring signal can contribute to improve the position determination of the positional element. In particular, when interpolating the position of the positional element, i.e., when resolving the position more precisely than the distance of two adjacent coils, the tapering end can be of support.

Furthermore, the positional element can be twice as long in the direction of the trajectory than a distance of two adjacent coils. In this embodiment, it is especially preferred that the positional element is tapered on both sides in the manner described above. As a result, it is possible that a maximum of three adjacent coils are influenced by the positional element and thus supply a signal for the position determination that can be evaluated.

Preferably, the width of the positional element corresponds to the width of the coil. In one embodiment, a ferromagnetic and electrically insulated element is mounted on the coil. Said element can contribute to increasing the basic inductance of the coil, so that a further improved measuring signal can be provided. For example, the element described can be mounted on a surface of the coil, so that the coil is protected against any electrical contact by the positional element. The vertical distance of the positional element from the coil can be defined by the electrically insulated element.

The evaluation device can be designed to determine the position on the basis of the inductance by means of a predetermined characteristic curve. Usually, the connection between the inductance of the coil and the distance or relative position of the positional element is non-linear and often difficult to approximate formulistically. However, the connection can be recorded experimentally and stored in the form of the characteristic curve. In the case of multiple coils, it is also possible to use a characteristic curve, which indicated the position based on two or more inductances.

The evaluation device can be designed to determine the position of the coil based on a change in inductance, which depends on the position of the position element. As a result, it is no longer required to determine the absolute inductance of the coil.

BRIEF DESCRIPTION OF THE DRAWINGS

Subsequently, the invention is described in more detail with reference to the enclosed figures, in which.

DETAILED DESCRIPTION

Figure 1:
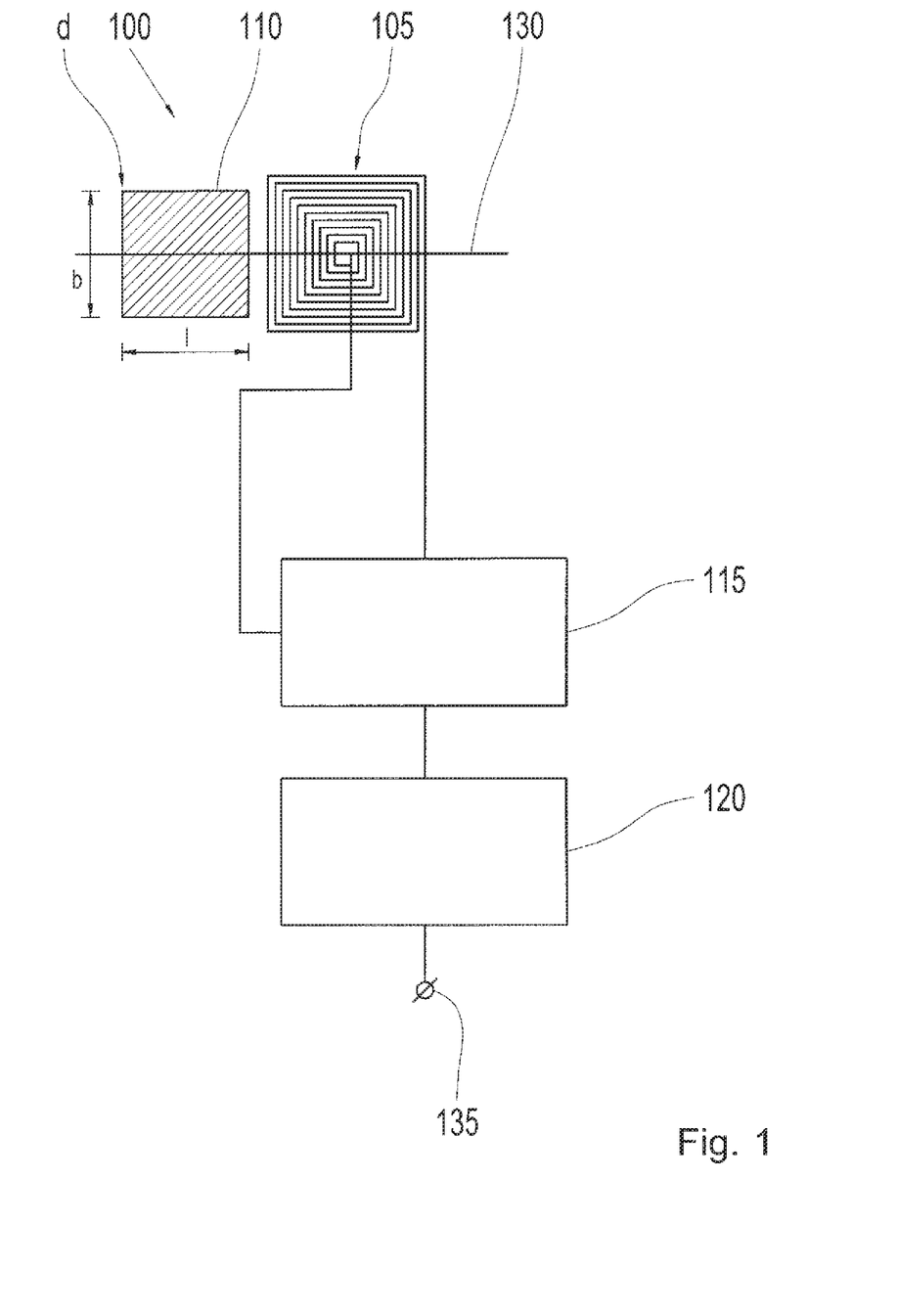
FIG. 1 shows a block diagram of a device for inductive position determination.

FIG. 1 shows a block diagram of a device 100 for inductive position determination. For example, the device 100 can be used to determine on board of a motor vehicle a position of the selector lever for an automatic transmission, a position of an adjustable seat, a position of an adjustable exterior mirror or a position of a movable gas pedal. Other position determinations, in particular on board of the motor vehicle, are also possible.

The device 100 comprises a coil 105, a positional element 110, a scanning device 115 and an evaluation device 120. The coil 105 can be designed in any form. However, preferably it is designed in the form of a single or multi-layer flat coil. In particular, the coil 105 can be produced from a highly conductive material, for example, silver, copper, aluminum or gold, wherein the material can be printed, edged or glued in the form of a compound. The positional element 110 can be moved in relation to the coil 105, wherein the movability of the positional element 110 along a predetermined trajectory 130 can be limited. Preferably, the trajectory 130 extends through the central point or longitudinal axis of the coil 105 and a corresponding central point of the positional element 110. Preferably, the positional element 110 has a flat designed and is designed in such a way that its contours cover the surface of the coil 105, when the positional element 110 on the trajectory 130 maximally approximates the coil 105. A length l of the positional element 110 extends along the trajectory 130 and a width b is perpendicular to it. Preferably, a width d long the longitudinal axis of the coil 105 amounts to at least a few tenths millimeter. The larger the thickness d, the higher is the magnification of the induction of the coil 105, when the positional element 110 is brought into the range of the coil 105. Preferably, the thickness d of the positional element 110 ranges between app. 0.5 and 3.5 mm, further preferred between 1 and 2 mm.

The positional element 110 comprises a ferromagnetic and electrically insulated material, for example, nickel zinc ferrite, manganese zinc ferrite or a different highly permeable electrically poorly conducting material. For example, they can be obtained under the designation MP1040-200, MP1040-100 by Laird-Technologies or under the designation WE354006 from the WE-FSFS-354—material group by Würth-Elektronik. In particular, these materials are suitable for protecting 13.56 MHz-RFID-transponders. For example, in a block shape having a length and width of 60 mm, respectively, and a thickness of 0.3 mm at 13.56 MHz, the material WE354006 has a complex permeability $\mu'=150$, $\mu''=90$, wherein the relative permeability is defined at $\mu_r=\mu'-j\mu''$ or $\mu_r=B/B_0=\sqrt{(\mu'^2+\mu''^2)}=$app. 175. At the same time, B defines the magnetic flow density in the ferrite material and $B_0$ the magnetic flow density in air or vacuum.

A thickness of the ferrite material has an effect on the preciseness of position recognition. On an individual basis, the inductance of a measuring coil significantly increases with increasing thickness of the positional element. For example, it is possible to achieve an inductance increase by 40 percent with a single-layer coil having a relative distance of 0.3 mm to a positional element, which is produced from the Mirth material WE354006 and which has a length of 11 mm, a width of 5.5 mm and a thickness of 0.3 mm. Thinner materials, such as the Mirth materials WE354004 and WE354005, have considerably less influence on the inductance of the measuring coil, while having the same material properties as WE354006, but a smaller thickness of 0.1 mm or 0.2 mm.

The material must be selected in such a way that the remagnitizing losses in an electromagnetic alternating field of the coil 105 are considerably lower than the amplification effect of the inductance of the coil 105, in order to achieve a clear amplification effect when the positional element 110 is approximated to the coil 105. Well-known materials for the positional element 110 can be used with frequencies of up to 15 MHz and more.

The scanning device 115 is designed to excite the coil 105 with an electrical signal, in particular a regular signal with constant frequency, preferably a rectangular or sine wave. To determine the inductance of the coil 105, the evaluation device 120 can comprise, for example, an ohmic inductive potential divider. The scanning device 115 provides the evaluation device 120 with a signal, which depends on a signal, which is dependent on the inductance of the coil 105 or the change of inductance of the coil 105 when approximating the positional element 110. The evaluation device 120 can be produced in an analogous or digital manner. In one embodiment, the evaluation device 120 determines the position of the positional element 110 in relation to the coil 105 by means of a characteristic curve stored in a memory. For example, the characteristic curve can be recorded in an experimental manner. The evaluation device 120 can provide the position of the positional element 110 via an optional interface 135.

Figure 2:
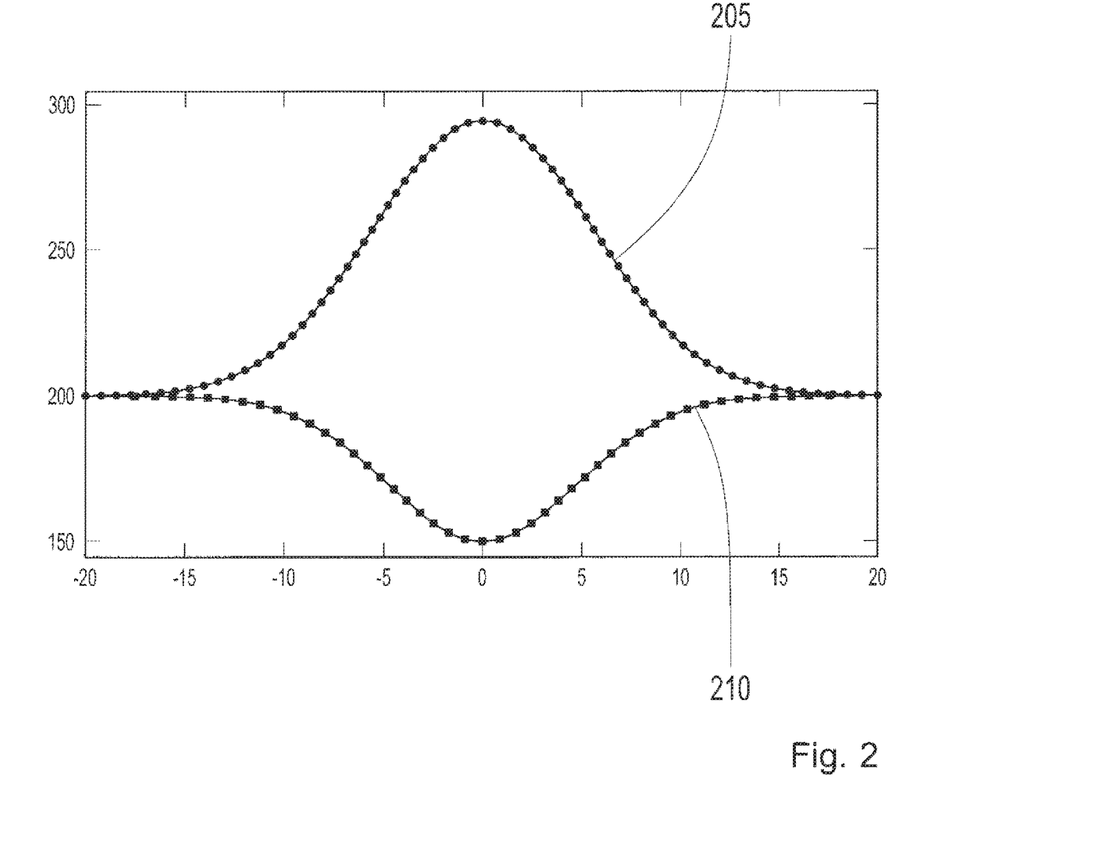
FIG. 2 shows an inductance of a coil, depending on the position of a positional element.

FIG. 2 shows the inductance of the coil 105 depending on the position of the positional element 110 on the device shown in FIG. 1. In horizontal direction, the position of the positional element 110 along the trajectory 130 is displayed in millimeters and in vertical direction the change of inductance of the coil 105 in nH in response to the position of the positional element 110. The magnitudes and curve shapes used are considered to be of purely exemplary nature.

The first characteristic curve 205 shows the increase of inductance of the coil 105 when approximating the positional element 110. By way of comparison, a second characteristic curve 210 shows the decrease of the inductance of the coil 105 under comparable circumstances, using an electrically conductive positional element 110. Not only does the characteristic curve 205 show a stronger change in maximum approximation of the positional element 110 to the coil 105 than the second characteristic curve 210. It also shows a wider form, which can be advantageously used for a more precise determination of the position.

On a device 100 according to FIG. 1, which has a positional element 110 with a thickness d of 1.91 mm, a vertical distance of 0.3 mm to the coil 105, a permeability number of more than 150, the displayed maximum amplification of the inductance of the 105 of app. 48 percent was determined. At the same time, the positional element 110 had a width b of 5.5 mm, a length l of 11 mm and consisted of the material MP1040-200. The coil 105 had a diameter of 5.45 mm and was designed in the form of a flat coil having nine coils. A positional element 110, which was identical in length and width 110 and produced from the material MP1040-100 with the different thickness d of 1.27 mm resulted in an amplification of the inductance of the coil 105 of app. 44 percent.

FIG. 3 shows different embodiments of arrangements of the coil 105 and the positional element 110 on the device 100 shown in FIG. 1.

Figure 3A:
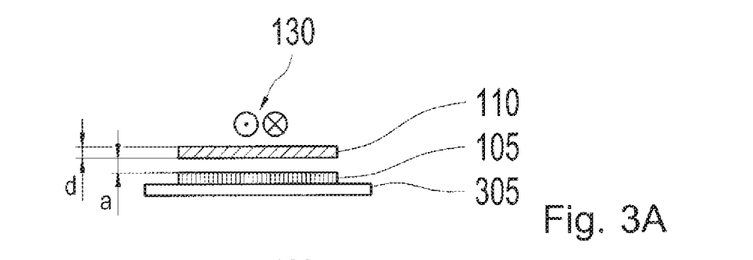
FIG. 3 shows different embodiments of a coil and a positional element for the device shown in FIG. 1.

FIG. 3a shows the coil 105 designed in the form of a flat coil on the surface of a circuit board 305. For example, the circuit board 305 can be produced from ceramics, glass, polyimide, FR4 or any other suitable carrier material. Alternatively, the coil 105 can also be mounted, for example glued, on the surface of an element available on a measuring arrangement. The positional element 110 is arranged at a predetermined height h above the coil 105. Preferably, said height h is maintained when the positional element 110 changes its position in relation to the coil 105. The trajectory 130 is indicated in symbolic manner above the positional element 110.

Figure 3B:
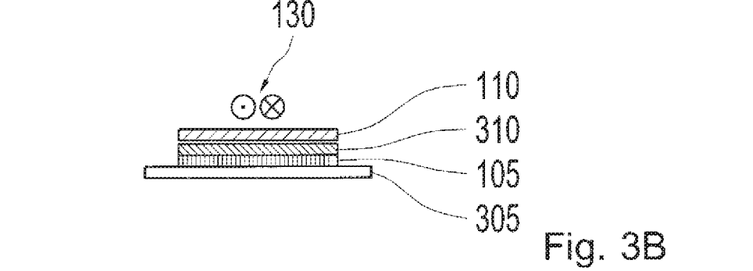

FIG. 3b shows a similar embodiment. However, in this embodiment, a ferromagnetic and electrically insulated element 310 is provided in addition in the area of the coil 105. Preferably, the element 310 is located between the coil 105 and the positional element 110, so that the positional element 110 rest against the surface of the element 310. Additionally, or alternatively, it is also possible to mount a ferromagnetic and electrically insulated element 310, for example, on the lower side of the circuit board 305, which faces away from the coil 105.

Figure 3C:
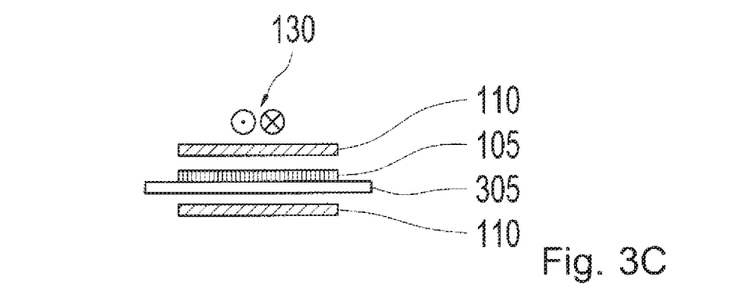

FIG. 3c shows an embodiment with two positional elements 110, which are arranged on different vertical sides of the coil 105 and mechanically connected with each other in an appropriate manner. As a result, it is possible to increase the inductance of the coil 105, depending on the position of the positional elements 110.

Figure 3D:
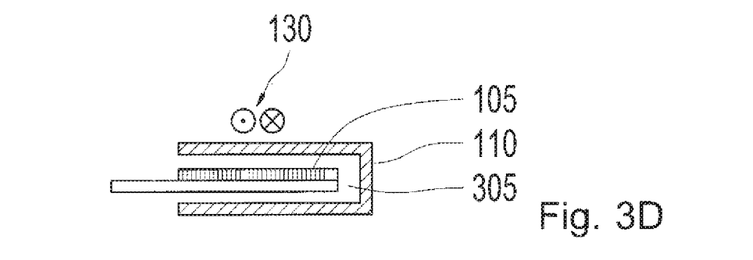

FIG. 3d shows a similar embodiment, in which the positional element 110 encompasses the circuit board 305 and the coil 105 on one side.

Figure 3E:
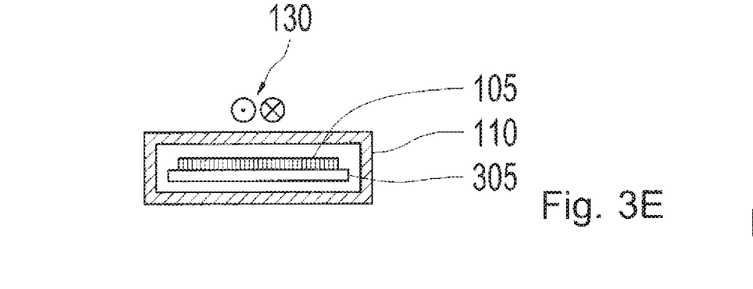

FIG. 3e shows an embodiment, in which the positional element 110 encompasses the circuit board 305 and the coil 105 on both sides.

Figure 4:
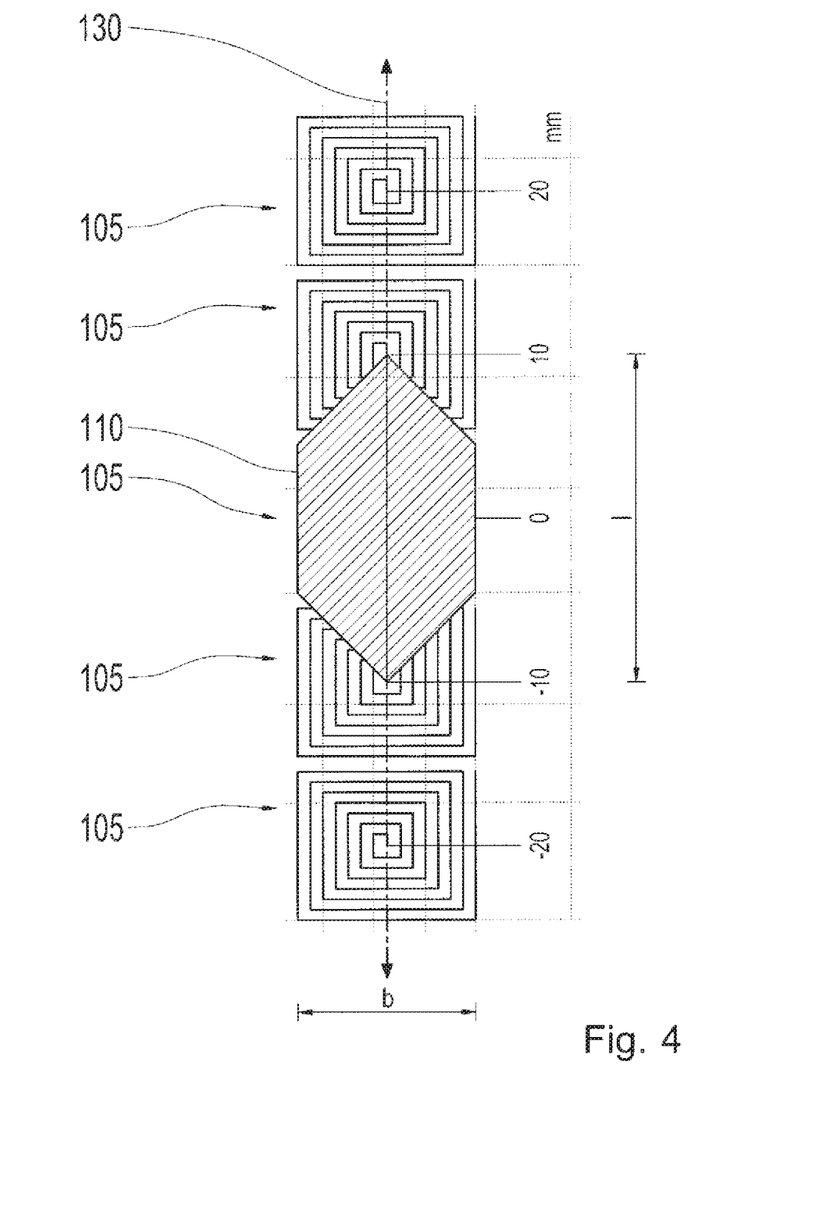
FIG. 4 shows an arrangement of multiple coils for the device shown in FIG. 1.

FIG. 4 shows an arrangement of multiple coils 105 for the device 100 shown in FIG. 1. In horizontal direction, an exemplary positioning scale is shown, which corresponds to the central point of the median coil 105, (which is covered by the positional element 110). The coils 105 are uniformly arranged along the trajectory 130 and basically have similar surfaces.

The positional element 110 comprises a middle segment, which has the form of the surface of a coil 105 (in the present example, it is rectangular), and preferably continues to extend on both sides along the trajectory 130 in tapering extensions. Preferably, said extensions are triangular, and the total length l of the positional element 110 along the trajectory 130 is twice as large as the distance of two adjacent coils 105. In other words, the positional element 110 has the form of a diamond, which extends along the trajectory 130 up to the longitudinal axes of coils 105, which are adjacent on different sides to a completely covered coil 105. By using multiple coils 105, especially coils that are adjacent to each other, it is possible to improve the determination of the position of the positional element 110, based on the induction of the coils 105. The form of the positional element 110 shown with tapered ends can be used to ensure that not only one coil 105, which is minimally distant from the positional element 110, is influenced in a measurable manner in its inductance by the positional element 110, but also an adjacent coil 105.

Figure 5:
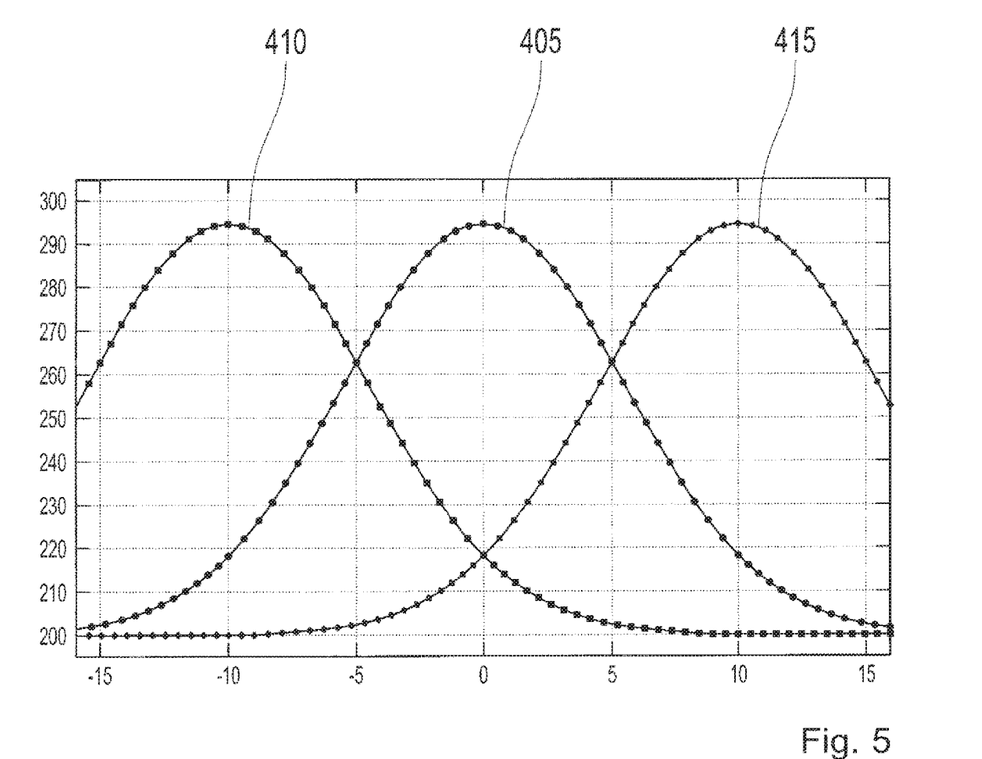
FIG. 5 shows representations analogous to FIG. 2 on several of the coils shown in FIG. 4.

FIG. 5 shows representations analogous to FIG. 2 on three adjacent coils 105 of the arrangement shown in FIG. 1. The position of the positional element 110 in relation to the trajectory 130 shown in FIG. 4 is represented in horizontal direction. And inductances of the median coil 105 and its right and left adjacent coils shown in FIG. 4 are represented in vertical direction. The inductance values shown are considered to be exemplary. The positional element 110, on which the inductances shown 405, 410 and 415 are based, has the form of a diamond, as shown in FIG. 4. It is clear that the position of the positional element 110 can be determined with a lower resolution than the distance of two adjacent coils 105, when the inductances of multiple coils 105 are taken into consideration. For example, the inductances of the individual coils 105 can be determined by means of multiplexes, i.e., by sequentially connecting the coils 105 with the scanning device 115.

Figure 6:
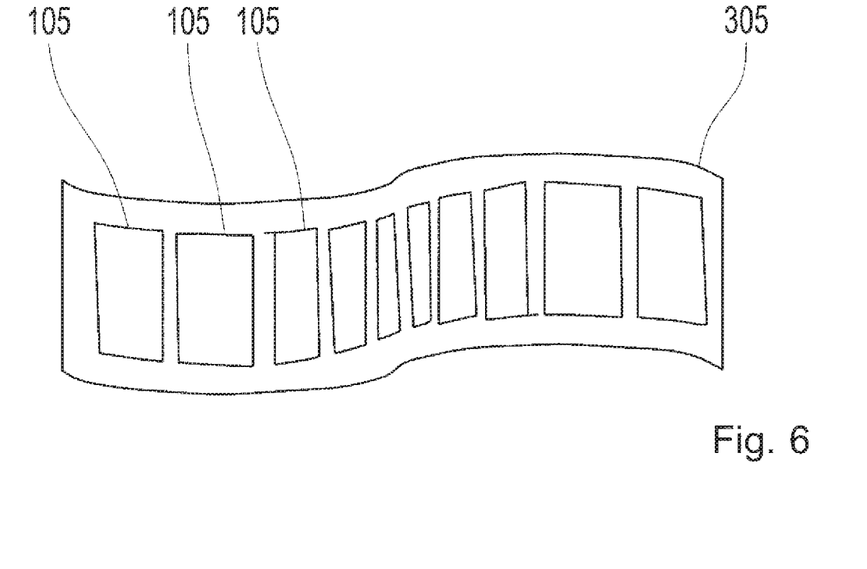
FIG. 6 shows a non-planar arrangement of coils for the device shown in FIG. 1.

FIG. 6 shows a non-planar arrangement of coils 105 for the device 100 shown in FIG. 1. For example, the embodiment shown in FIG. 3a can be bent along a curve or surface. Preferably, the trajectory 130 extends through longitudinal axes of all coils 105, and further preferred in uniform height in relation to the coils 105 or the circuit board 305.

Figure 7:
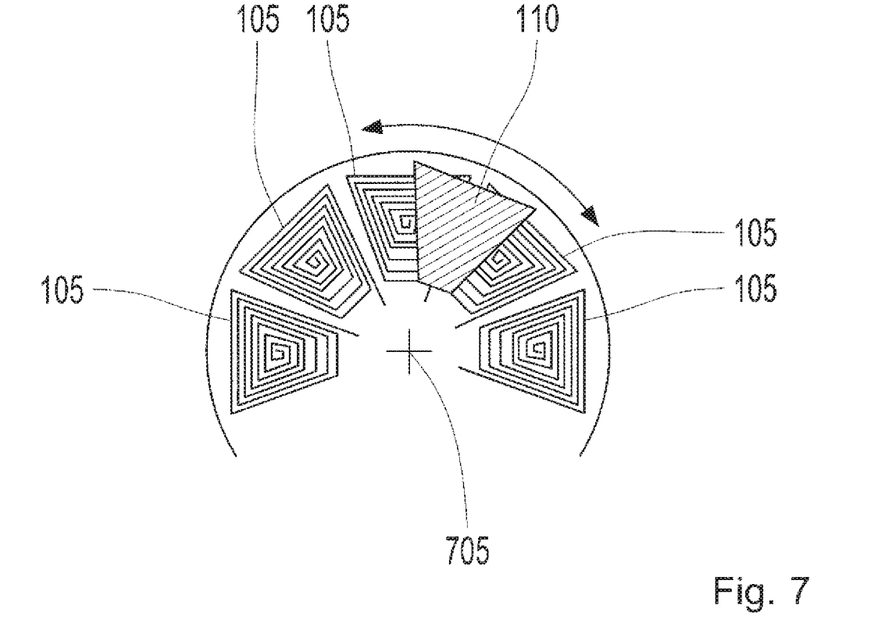
FIG. 7 shows a rotationally symmetrical arrangement of coils for the device shown in FIG. 1.

FIG. 7 shows a rotationally symmetrical arrangement of coils 105 for the device 100 shown in FIG. 1. By means of this arrangement, it is possible to determine a rotational position of the positional element 110 about a rotational axis 705.

REFERENCE NUMERALS 100 device
105 coil
110 positional element
115 scanning device
120 evaluation device
130 trajectory
135 interface
205 first characteristic curve
210 second characteristic curve
305 circuit board
310 ferromagnetic and electrically insulated element
405 first inductance
410 second inductance
415 third inductance
705 rotational axis

What is claimed is:

1. A device for inductive position determination, comprising:
   a coil;
   a positional element;
   a scanning device for determining an inductance of the coil; and
   an evaluation device for determining a position of the positional element in relation to the coil, based on the inductance determined, wherein the positional element comprises a ferromagnetic and electrically insulated material, wherein a ferromagnetic and electrically insulated element is mounted on the coil.

2. The device according to claim 1, wherein the positional element has a relative permeability of more than 150.

3. The device according to claim 1, wherein the positional element has an electrical conductivity of less than $10^{-6}$ S/m.

4. The device according to claim 1, wherein the coil is a single-layer flat coil.

5. The device according to claim 1, wherein:
   at least two coils are provided;
   the positional element can be moved on a predetermined trajectory in relation to the at least two coils; and
   the evaluation device is configured to determine the position of the positional element on the predetermined trajectory, based on inductances of the at least two coils.

6. The device according to claim 5, wherein the positional element in the direction of the predetermined trajectory is tapered at least on one end.

7. The device according to claim 5, wherein the positional element in the direction of the predetermined trajectory is approximately twice as long as a distance of two adjacent coils.

8. The device according to claim 1, wherein a width of the positional element corresponds approximately to a width of the coil.

9. The device according to claim 1, wherein the evaluation device is configured to determine the position of the positional element based on the inductance by means of a predetermined characteristic curve.

10. The device according to claim 1, wherein the evaluation device is configured to determine the position of the positional element based on a change of inductance of the coil depending on the position of the positional element.

* * * * *